(12) United States Patent
Direnzo et al.

(10) Patent No.: US 6,288,514 B1
(45) Date of Patent: Sep. 11, 2001

(54) COMMUTATION METHOD AND APPARATUS FOR SWITCHED RELUCTANCE MOTOR

(75) Inventors: Michael T. Direnzo, Coppell; Wasim Khan, Stafford, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,312

(22) Filed: Oct. 1, 1999

Related U.S. Application Data

(60) Provisional application No. 60/102,846, filed on Oct. 2, 1998.

(51) Int. Cl.[7] .................................. H02P 8/00; H02P 1/46
(52) U.S. Cl. ............................ 318/701; 318/715; 318/799
(58) Field of Search ................................ 318/245, 254, 318/138, 439, 701, 638, 685, 799, 607

(56) References Cited

U.S. PATENT DOCUMENTS

| | | | |
|---|---|---|---|
| 4,959,596 | 9/1990 | MacMinn et al. . | |
| 5,051,680 | 9/1991 | Belanger . | |
| 5,140,243 | 8/1992 | Lyon et al. . | |
| 5,196,775 | * 3/1993 | Harris et al. | 318/638 |
| 5,300,841 | * 4/1994 | Preston et al. | 310/90.5 |
| 5,481,166 | 1/1996 | Moreira . | |
| 5,530,326 | 6/1996 | Galvin et al. . | |
| 5,703,456 | * 12/1997 | Cox | 318/701 |
| 5,796,194 | * 8/1998 | Archer et al. | 310/68 B |
| 5,811,954 | * 9/1998 | Randall | 318/701 |
| 5,814,965 | * 9/1998 | Randall | 318/701 |
| 5,821,713 | * 10/1998 | Holling et al. | 318/439 |
| 5,864,217 | * 1/1999 | Lyons et al. | 318/652 |
| 5,982,117 | * 11/1999 | Taylor et al. | 318/254 |

* cited by examiner

*Primary Examiner*—Paul Ip
(74) *Attorney, Agent, or Firm*—April M. Mosby; W. James Brady; Frederick J. Telecky, Jr.

(57) ABSTRACT

A method for commutation of a switched reluctance motor (SRM) is disclosed that requires no rotor position sensor or detailed prior knowledge of the motor's magnetic characteristics. The apparatus and method employs a calibration routine to learn the flux-current characteristics of each SRM phase in its aligned position. From these characteristics, the flux-current characteristics at other appropriate switching angles are approximated. Commutation is accomplished by estimating the flux in an active phase and comparing the estimate to the flux approximated for the switching angle. The apparatus and method is particularly well suited for relatively heavy duty loading applications, such as a fan.

11 Claims, 6 Drawing Sheets

COMMUTATION METHOD AND APPARATUS FOR SWITCHED RELUCTANCE MOTOR

This application claims benefit of provisional application Ser. No. 60/102,846, filed Oct. 2, 1998.

FIELD OF THE INVENTION

This invention relates generally to switched reluctance motor drive systems; and in particular, to an apparatus and method for commutation of a switched reluctance motor.

BACKGROUND OF THE INVENTION

Due to high system efficiency over a wide range of speed, multiphase switched reluctance motors (SRMs) are favored for their variable-speed drive applications. A conventional SRM includes salient rotor and stator poles, as shown in FIG. 1. Such motors typically have a fixed stator structure comprising one or more phase windings, and a rotor structure. As shown, each pair of diametrically opposite stator pole windings is connected in series or in parallel to form an independent phase winding of the multiphase SRM. Direct current is selectively switched to pass through the phase windings. Resultant electromagnetic fields induced by the windings interact with the fixed fields of the rotor in a manner resulting in a rotary force or torque which causes the rotor to rotate relative to the stator.

Illustrated in FIG. 2, when the stator and rotor poles are aligned, maximum inductance exists. Applying the definition of torque $$\left(\text{i.e. } T \alpha \frac{dL}{d\theta} i^2\right)$$

and noting the relationship between inductance, angular position and phase in FIG. 3, when the poles are aligned, the change of inductance, dL, is positive. Thus, torque, T, is positive. In order to maintain positive torque, however, it is necessary to switch the applied current off at some reference angle $\theta_{ref}$ just prior to the change of inductance dL of the phase becoming negative which corresponds to the phase at an unaligned position. Thus, switching current from one phase winding to the next in a predetermined sequence that is synchronized with the angular position of the rotor continuously generates positive torque. As such, SRMs require angular rotor position sensing devices to determine the position of the rotor and thereby, maintain positive torque of the rotor.

In conventional SRMs, a shaft angle transducer, such as an encoder or a resolver, generates a rotor position signal and a controller reads this rotor position signal. In an effort to improve reliability while reducing size and cost, various approaches have been previously proposed to eliminate the shaft position sensor by determining the reference commutation angle. These approaches implement indirect rotor position sensing by monitoring terminal voltages and currents of the motor.

One approach is disclosed in U.S. Pat. No. 4,959,596, issued to S. R. MacMinn, et al., on Sep. 25, 1990 which patent is incorporated by reference herein. As disclosed, a method of indirect motor position sensing involves applying voltage sensing pulses to one unenergized phase. The result is a change in phase current which is proportional to the instantaneous value of the phase inductance. Proper commutation time is determined by comparing the change in phase current to a reference current, thereby synchronizing phase excitation to rotor position. Phase excitation can be advanced or retarded by decreasing or increasing the threshold, respectively. Due to the unavailability of inactive phases during higher speeds, this commutation method which makes use of the inactive phases of the SRM are limited to low speeds. Furthermore, although current and torque levels are relatively small in an inactive phase, they will contributed to a loss in SRM efficiency.

Another such approach is disclosed in U.S. Pat. No. 5,140,243, issued to J. P. Lyons, et al., on Sep. 25, 1990 which patent is incorporated by reference herein. As disclosed, a method of indirect motor position sensing involves using a flux-current map of a given SRM, such as the one illustrated in FIG. 2. Utilizing this flux-current map, measured phase voltage, phase current and phase resistance and estimated flux provided necessary data to determine a reference angle. Comparison of the estimated phase flux to the reference flux is the basis for commutating the motor. The disadvantage of this approach is that the flux-current characteristics of a motor are not readily known; thereby, requiring costly calibration measurements. Additionally, these characteristics exhibit change over time, requiring recalibration of the SRM. Therefore, this commutation method is costly.

Although the above-cited patent advantageously provides a method for indirectly determining rotor position so that a conventional rotor position sensor is not required, it is desirable to provide a method which does not require the need for prior knowledge of the flux-current characteristics of the SRM.

A control system and method for a multiphase switched reluctance motor (SRM) provides commutation of the motor operable at high speeds, requiring no rotor position sensor not detailed prior knowledge of the SRM magnetic characteristics. This commutation method and system includes two routines: a calibration routine and a commutation routine. The calibration routine is a self-training calibration routine to determine the flux-current characteristics of each phase in an aligned position. During this calibration routine, voltage sensing pulses of current applied to an active phase (i.e. one producing torque) create a change in phase current which is inversely proportional to the instantaneous value of the phase inductance. Using the integral form of Faraday's law, each pulse of current provides the appropriate variables to determine phase flux. Subsequent interpolation of the data to fit a curve provides the necessary data for deriving flux-current characteristics at a reference angle for commutating the motor. During the commutation routine, a commutation algorithm commutates the SRM by measuring the flux in an active phase and comparing the flux to one approximated for the reference angle.

The method of the invention is particularly well-suited for relatively heavy duty loading applications, such as a fan.

DETAILED DESCRIPTION OF PREFERRED EMBODIMENTS

The present invention improves the prior art by providing an approach for commutating an SRM, without a position sensor, while removing the requirement of a predetermined mode of a flux-control relationship of the SRM. Accordingly, a method and apparatus providing indirect estimation of instantaneous rotor angular position is disclosed.

Figure 1:
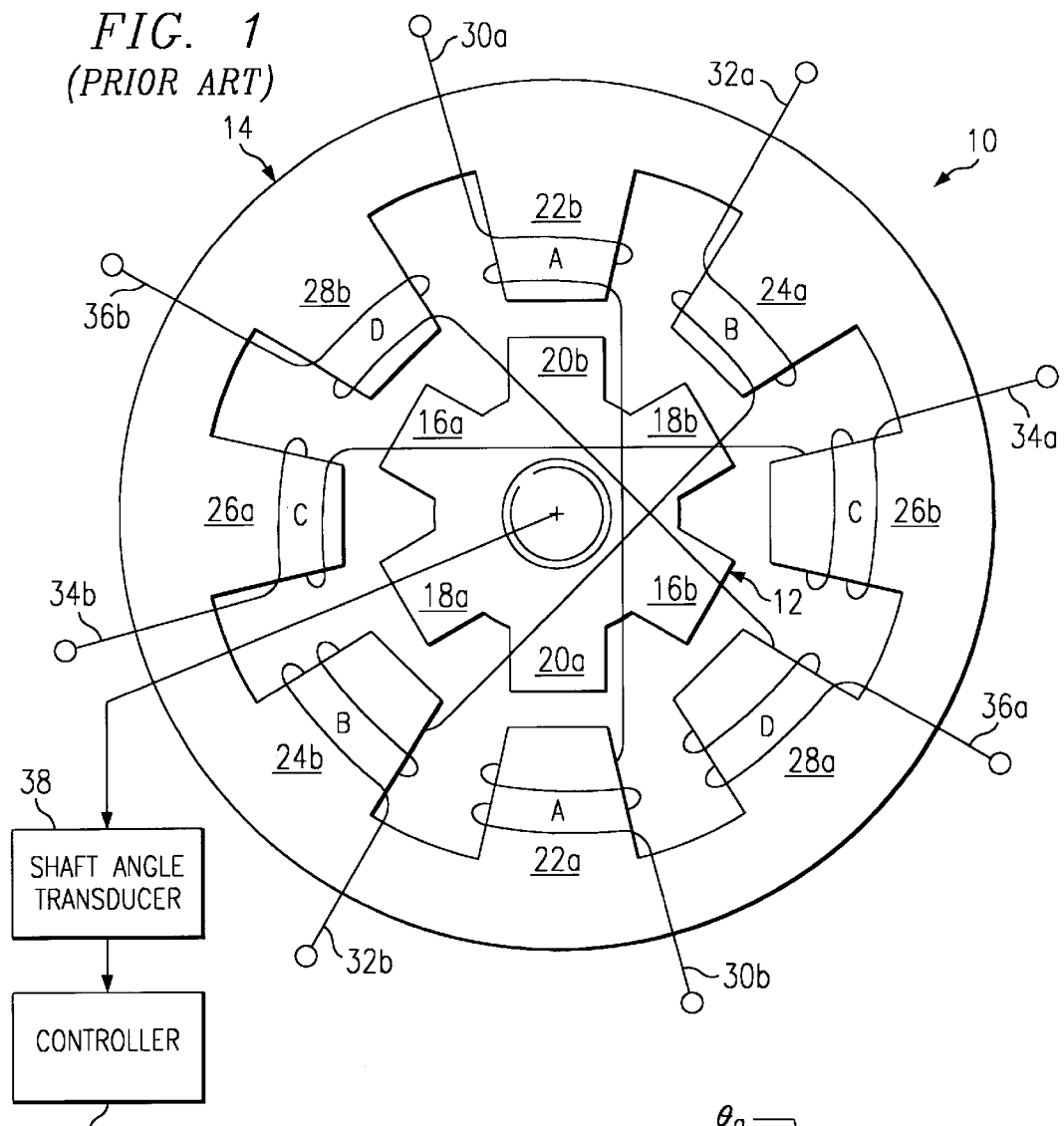
FIG. 1 is a schematic cross-sectional view of a conventional four-phase SRM.

FIG. 1 shows a conventional SRM drive configuration. By way of example, SRM 10 is illustrated as a four-phase machine. As shown, SRM 10 includes a rotor 12 rotatable in either a forward or reverse direction within a stationary stator 14. Rotor 12 has three pairs of diametrically opposite rotor poles 16a–16b, 18a–18b and 20a–20b. Stator 14 has four pairs of diametrically opposite stator poles 22a–22b, 24a–22b, 26a–26b and 28a–28b. Stator pole windings 30a–30b, 32a–32b, 34a–34b and 36a–36b, respectively, are wound on stator pole pairs 22a–22b, 24a–24b, 26a–26b and 28a–28b forming four phases A, B, C, and D. As illustrated, the rotor is in the aligned position for phase A and the unaligned position for phase C. Conventionally, the stator pole windings on each pair of opposing or companion stator pole winds comprising each companion pair 30a–30b, 32a–32b, 34a–34b and 36a–36b are connected in series with each other and with an upper and lower current switching devices, respectively. Each phase winding is further coupled to a dc source, such as a battery or rectified ac source, such as a return diode. At the end of each conduction interval of each phase, stored magnetic energy in the respective phase winding is returned, through each respectively coupled diode to the dc source.

Typically, as shown in FIG. 1, a shaft angle transducer 38, e.g. an encoder or a resolver, is coupled to rotor 12 for providing rotor angle feedback signals to machine controller 40. An operator command, such as a torque command, is also generally supplied as an input signal to controller 40. The controller 40 provides firing signals to the stator windings for energizing the machine phase windings in a predetermined sequence, depending upon the particular quadrant of operation. To improve reliability of the SRM while reducing size and cost, it is desirable to eliminate the rotor position sensor. Accordingly, the purpose of this invention is to provide a useful approach for operating the SRM, while eliminating the need for a rotor position sensor.

In an effort to eliminate the rotor position sensor, it is necessary to determine a reference flux $\psi_{ref}$ measurement of the SRM at which point a control means in the present invention will provide voltage to the stator windings sufficient to energize the next machine phase. Thus, an analysis of the flux-current characteristics of the winding linkages is a precursor to elimination of the rotor position sensor.

Figure 2:
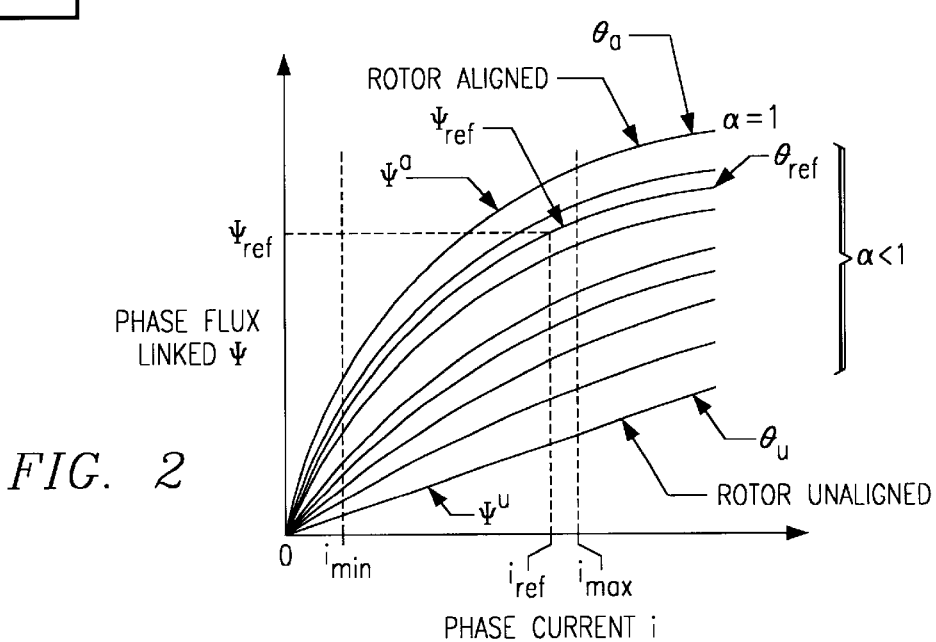
FIG. 2 is a flux-current-angle mapping relationship of a conventional SRM.

As shown in FIG. 2, phase flux $\psi$ is proportional to current I for different values of rotor angle $\theta$. The current I in one phase winding of a SRM and the flux linked $\psi$ by that winding are related by the winding inductance L according to the following expression: $\psi = L\,I$. Thus, if phase flux linkage $\psi$ is plotted against phase current I, the slope of the resulting graph is the phase inductance, The bending of the curves at higher values of flux $\psi$ is caused by magnetic saturation of the iron in the motor. Curve $\psi^a$, which has the steepest initial slope, represents the $\psi$-I curve for the excited phase when the stator poles of that phase are aligned with rotor poles, the rotor angle corresponding thereto being designated as $\theta_a$. On the other hand, curve $\psi^a$, which has the smallest initial slope represents the $\psi$-I-curve for the excited phase when the stator poles of that phase are at the point of maximum unalignment with rotor poles of the SRM, the rotor angle corresponding thereto being designated as $\theta_a$. The curves falling between curves $\psi^a$ and $\psi^a$ represent intermediate inductance values corresponding to varying slopes of the curves monotonically decreasing as the rotor advances from the aligned position to the unaligned position. Curve $\psi_{ref}$ represents the inductance value corresponding to the position of the rotor when the SRM is commutated. Note the flux estimated $\psi^a$ at an aligned rotor position is greater than the reference flux $\psi_{ref}$.

Additionally, as illustrated in FIG. 2, a number of current levels from $i_{min}$ to $i_{max}$ are established in the phase winding, where $i_{min}$ is the minimum current level below which the flux-current curves of the SRM exhibits very low resolution with respect to rotor position and $i_{max}$ is the maximum rated phase current of the motor.

Figure 3:
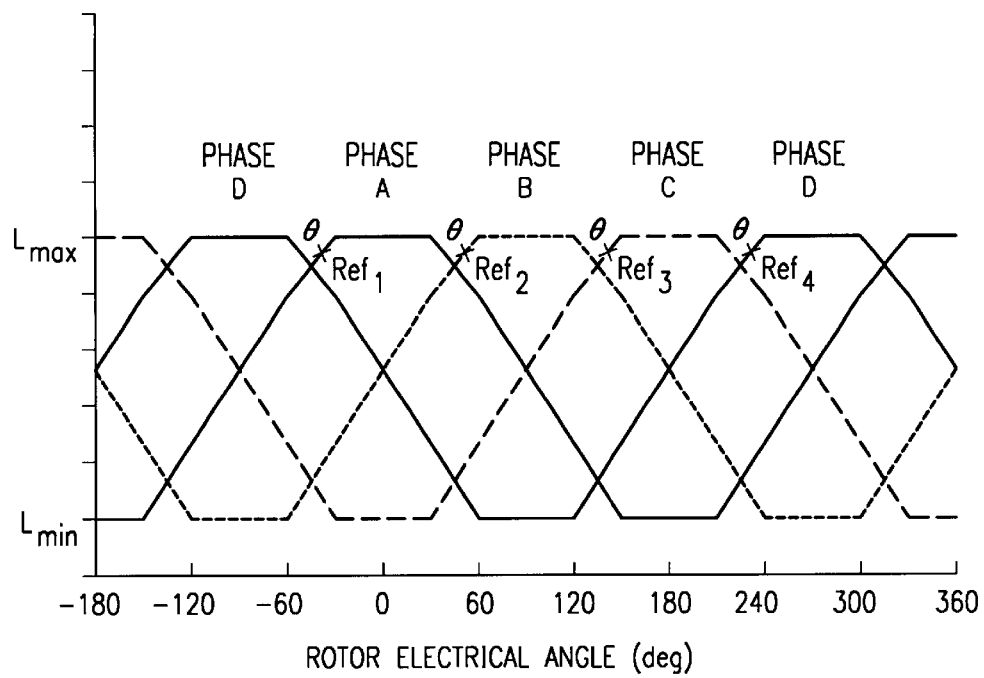
FIG. 3 is a variable inductance profile for the four-phase SRM of FIG. 1.
Figure 4:
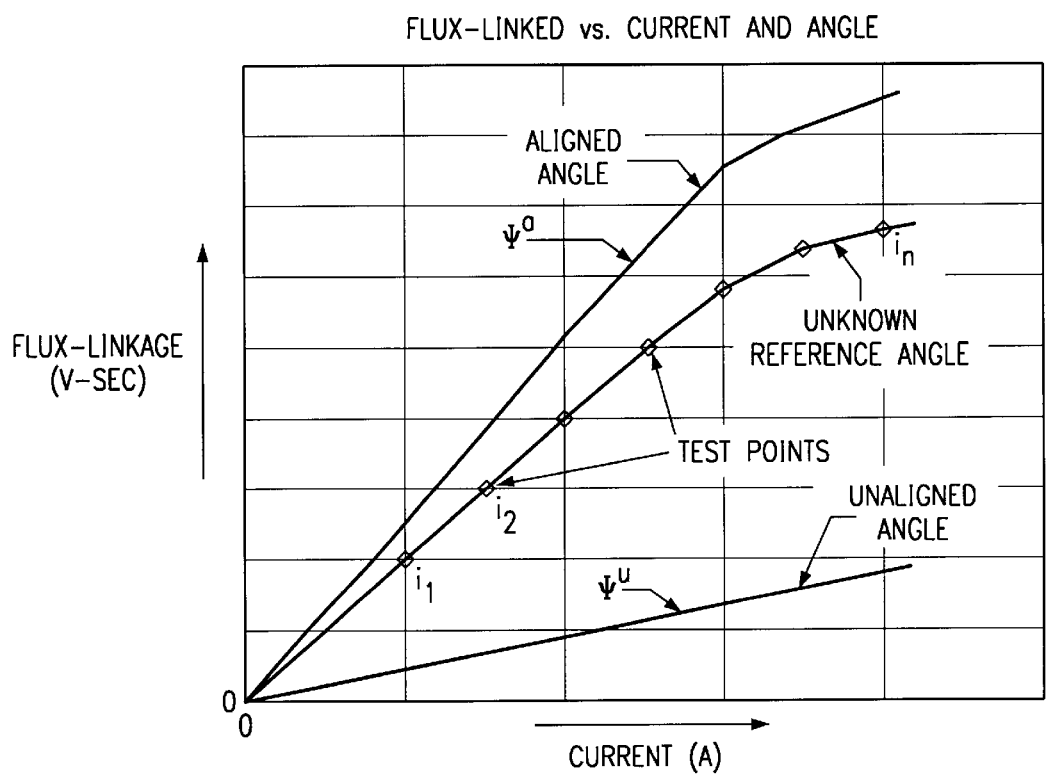
FIG. 4 is a flux-current-angle mapping relationship in accordance with the present invention.

As illustrated in FIG. 3, phase inductance for a four-phase SRM as viewed from the stator phase windings is a strong function of rotor position. Specifically, phase inductance ranges from a maximum value $L_{max}$, corresponding to alignment of rotor poles with the stator poles of the respective phase, to a minimum value $L_{min}$, corresponding to maximum unalignment of rotor poles with the stator poles of the respective phase.

Ideal phase inductance is a function of rotor angle $\theta$, in electrical degrees. A given inductance value occurs once as the rotor poles are moving toward alignment with stator poles of a respective phase, and again as the poles are moving away from alignment. From the given equation for phase flux $\psi$, it is apparent that this value of inductance can be determined by corresponding measurements of phase flux $\psi$ and phase current I. Phase flux $\psi$ can be made by employing the relationship between phase flux $\psi$, phase current I, and phase voltage V according to the following expression:

$$V = Ir + d\psi/dt$$

where r is the phase winding resistance. An estimate of flux can thus be determined from $$\psi_{est} = \int (V - Ir)dt$$

As is well known, the torque developed in any phase follows the relationship:

$$T \propto \frac{dL}{d\theta} i^2.$$

While the change in inductance, dL, with respect to the change in rotor angle, d$\theta$, is positive, the SRM will generate a positive torque. It is clear from FIG. 3, however, that where the change in rotor angle, d$\theta$, is negative, the SRM will generate a negative torque. Thus, in order to maintain positive torque, at some $\theta_{ref}$ the controller 40 must energize the next phase; for example, energizing phase B while de-energizing phase A.

The commutation algorithm according to the present invention starts with a calibration routine, followed by a commutation routine. The inventive method for commutation of a SRM requires neither direct rotor position sensing nor detailed prior knowledge or motor magnetic characteristics.

Figure 5:
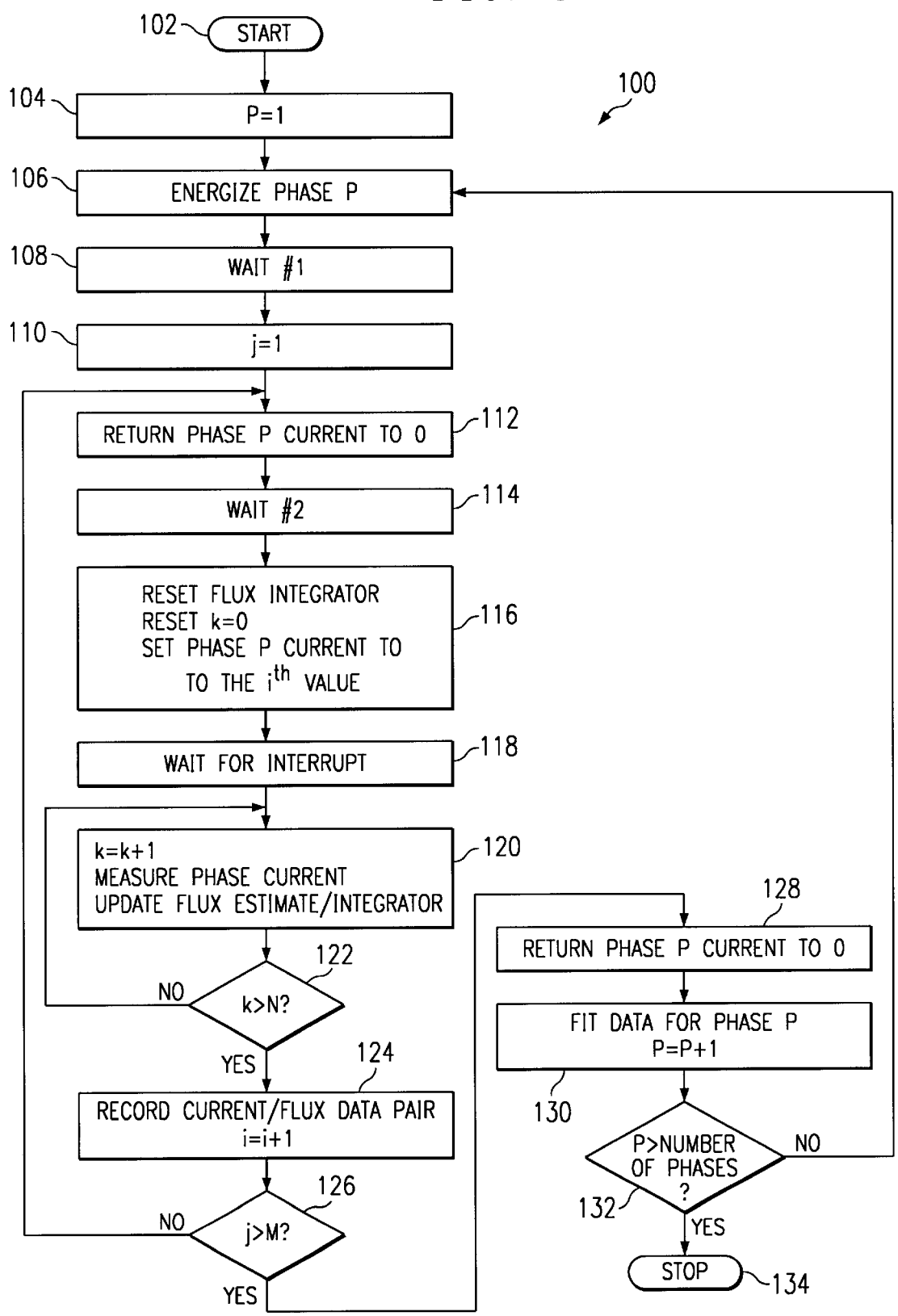
FIG. 5 is a SRM calibration routine flow chart in accordance with the present invention.
Figure 6:
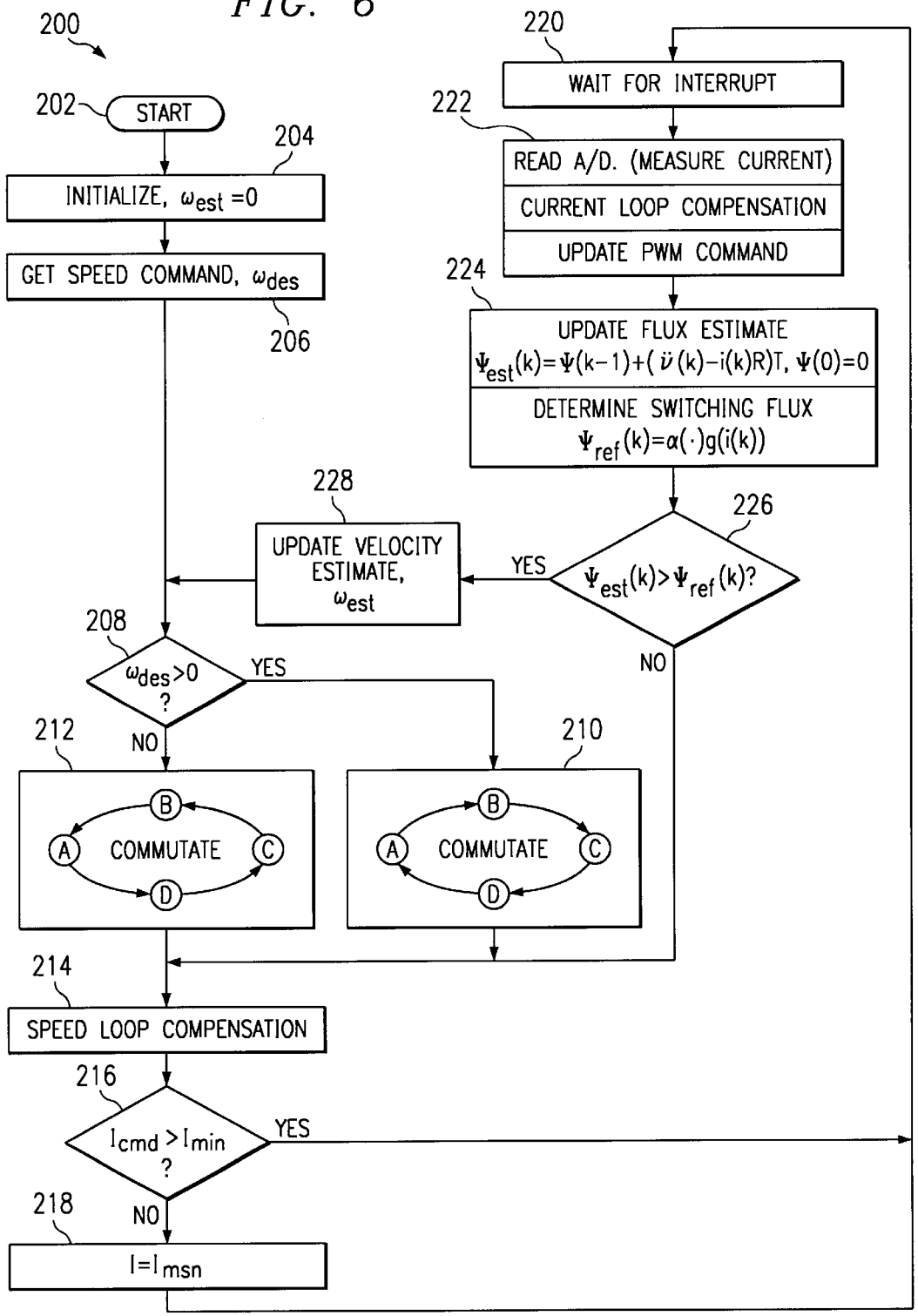
FIG. 6 is a SRM commutation routine flow chart in accordance with the present invention.

The two routines of commutation method, a calibration routine and a commutation routine, are set forth in FIGS. 5 and 6, respectively. During the calibration routine, the rotor is energized such that each motor phase is aligned and the corresponding phase flux-current characteristics of the SRM are estimated. During the commutation routine, these estimated characteristics are used to define the position sensorless operation of the motor.

By exciting any arbitrary phase with sufficient current to generate torque in excess of the starting friction of the motor, the rotor aligns with the aligns with the stator in the position of the energized phase. For example, when the first phase in the sequence, phase A, is energized, the rotor rotates and aligns itself with the stator poles of phase A. The direction of rotation, however, depends on the initial position of the rotor. Typically, the initial position of the rotor is unknown; thus, the initial direction of the motor is unpredictable. In certain applications, e.g. computer hard disk drives, this uncertain behavior is undesirable. In order to determine a calibration routine that produces rotation in a known direction, the technique, as described in U.S. Pat. No. 5,051,680 issued Sep. 24, 1991 to D. J. Belanger, may be implemented and is herein incorporated by reference. A control means applies small voltage pulses to all the motor phases and measures the resulting phase currents. These measurements determine the initial position of the rotor and thus, the phase of the SRM can be controllably energized in a specified Thereafter, each phase is energized in a predetermined sequence, i.e. for a four phase SRM, the sequence may be A, B, C, D, A, B, . . . Accordingly, at each aligned position, the calibration routine applies desired levels of current to each motor phase at a series of discrete test points.

At each current test point, estimated phase flux $\psi_{est}$ is calculated using the integral from of Faraday's law, $$\psi(k) = \left( \sum_{k=1}^{N} [v(k) - i(k)R(k)]T \right) + \psi(0) \quad [1]$$

where, $\psi(k)$=estimated phase flux at time, k v(k)=estimated voltage across the phase winding i(k)=measured phase current R(k)=estimated phase resistance T=sampling rate N=number of intervals in the estimation period $\psi(0)=0$ At the end of the estimation period (k=N), flux-current data pairs, [$\psi$(N), i(N)], are stored.

Before calibrating the next phase, a curve fitting technique (e.g., least squares curve fit) is sued on these data points to minimize the effect of measurement noise. Moreover, curve fitting at this stage also minimizes memory requirements by allowing simultaneous computation for subsequent phases. Furthermore, instead of storing large number of data points, only polynomial coefficients need be stored. As an example, a linear curve fit of the data is expressed as:

$$\psi_j^\alpha(i) = L_j^\alpha i_j$$

has a positive coefficient $L_j^\alpha$ which represents the slope of a straight line. Only this coefficient $L_j^\alpha$ is stored. Thus, the present invention not only reduces memory usage but also eliminates time consuming table lookups.

Upon completion of the calibration sequence and subsequent curve fitting of the data, the magnetic characteristics of the motor at the reference angle $\theta_{ref}$ are derived using the expression:

$$\psi(\theta_{ref}, i) = \alpha(i)g(i)$$

where $g(i) = \psi(\theta_{aligned}, i)$ and $0 \leq \alpha(i) \leq 1$. This calibration routine estimates the curve $\psi^\alpha$ for each phase and then uses a advance coefficient $\alpha$ proportional to the desired speed to define a reference flux level. The advance coefficient $\alpha$ is defined as a function of the estimated speed $\omega$.

$$\alpha = \alpha_0 - k_{60} |\hat{\omega}(t)|$$

where $k_\alpha$ and $\alpha_0$ are positive constants. Hence, as the actual speed increases, each phases is subsequently energized at shorter interval of time than its predecessor. When the estimated flux in the active phase exceeds the reference level, the next phase is energized.

The calibration procedure is repeated for each phase of the motor. The coefficients representing the curve can be stored in a non-volatile memory to avoid calibration after every power down.

FIG. 6 illustrates a flux-current diagram including an flux $\psi^\alpha$ at the aligned angle and reference flux $\psi_{ref}$ generated during the calibration routine of FIG. 5 in accordance with the present invention.

FIG. 5 sets forth a flow chart of firmware steps performed during the calibration routine, the initial operation mode 100 during which reference flux $\psi_{ref}$ is determined. The calibration routine 100 is entered at step 102. A step 104 initializes a phase counter variable P to 1. At step 106, the control means (not shown) applies a voltage across the windings of the SRM energizing phase P generating a step energizing current.

A step 108 initializes a wait period to wait for the rotor to cease oscillations prior to data collection. The time period, WAIT #1, must be greater than or equal to the time when the rotor settles after being energized in response to the step energizing current. Oscillation of the rotor is a factor of friction, inertia of the rotor and of the load. "Analysis of single-step damping in a multistack variable reluctance stepping motor," A. P. Russell and I. E. D. Pickup, IEE Proceedings on Electric Power Applications, January 1996, pp. 95–107, a non-patent publication, is incorporated by reference herein. Russell et al outline a method by which an analytical approach to defining a period of time to implement the proper wait period. Analysis may include factors of variation of load inertia and friction.

A step 110 initializes the count of the flux-current data pair, variable j, to 1. A step 112 initializes phase current to 0. A step 114 initializes another wait cycle of time period WAIT #2 for to wait for the current to dissipate. A step 116 then initializes the flux integrator and time k to 0. Step 116 also sets the phase current to the $i^{th}$ value. The voltage is either measured or more preferably computed inside the controller software e.g. in a system using pules-width modulated current controller. The average voltage across the phase is calculated according to the following expression:

$$v_j = d_j V_{bus}$$

where $d_j$ is the duty ratio of the phase transistor switch and $V_{bus}$ is the inverter bus voltage. The phase resistance can be readily measured by using an Ohm meter.

A step 118 initializes another wait cycle which responds to an interrupt signal from the DSP which defines the interval time sampling period of the algorithm T. A step 120 increments the time variable k to k+1. At this step, phase current is measured by a control means. Accordingly, phase flux is estimated using equation [1]. Control signals are applied to the phase windings causing current to flow through the windings for determining the initial position of the rotor with respect to the stator from a determination of relative magnitude of the current flow through the phase windings prior to activation of the phase windings to start rotation of the rotor. The estimated flux at k+1 is derived from the summation of estimate flux at k and the new measured values of voltage, current and resistance for the $j^{th}$ flux-current data pair.

A logical node 122 determines if the length of the estimation period, N is less than k. If it is not, a return is made to step 120. Steps 120 and 122 are repeated until k is greater than the length of estimation period, N. This represents the entire estimation period over which the phase current is read. A step 124 records the current-flux data pair and increments the count i by 1. A logical node 126 determines if j is greater than the number of current test points M. If it is not, a return is made to step 112 where the phase current at phase P is reinitialized to 0. If j is greater than M, all data samples have been determined and recorded, a step 128 reinitializes the phase current to 0.

A step 130 interpolates the data to a curve for a particular phase P. To estimate the flux at the next phase, the variable P representing the count for representative phases of the SRM is incremented in this step. A logical node 132 determines whether the count of phases P is greater than the number of possible phases in the SRM. If not, a return is made to step 106 and the phase is energized. Steps 108 through steps 132 are repeated until all current-flux data sample pairs are determined and recorded for each phase. If the count of phase P is greater than the possible number of phases in the SRM, a stop is initiated in step 134. This completes the rotor position sense routine.

FIG. 6 sets forth a flowchart of firmware steps performed during operation mode 200 during which the four phase SRM is commutated from one phase to the next. This commutation routine follows the calibration routine of FIG. 5 which determines calibrates the SRM having a known rotor position. The commutation routine is entered at step 202. A step 204 initializes the estimated velocity $\omega_{est}$ of the rotor to zero. A step 206 reads the desired speed command velocity $\omega_{des}$ of the SRM. A logical node 208 determines whether the desired velocity $\omega_{des}$ is greater than 0. If not, step 212 commutates the phases of the SRM in reverse order, using the sequence D-C-B-A. If in logical node 208 the desired velocity $\omega_{des}$ is greater than 0, a step 210 commutates the phase of the SRM in a forward direction, using the sequence A-B-C-D. A step 214 determines the speed loop compensation. A logical node 216 determines whether the current applied to the rotor is greater than the minimum operable current $I_{min}$ for the SRM. If not, a step 220 initializes the applied current I to equal the minimum operable current $I_{min}$. If the current applied to the rotor is greater than the minimum operable current $I_{min}$ for the SRM, then a step 220 waits for an interrupt signal from the DSP. By controlling the desired phase current $i_j^{des}$, the developed torque and speed are controlled. For example, a simple proportional controller is defined as, $$i_j^{des}=k_p(\omega^d(t)-\hat{\omega}(t))$$

where $k_p$ is the proportional gain.

A step 222 reads the phase current. Additionally at step 222, current loop compensation converts the desired current into switch commands. The PWM commands for selecting the proper PWM waveform are updated as well. A step 224 estimates the flux according to the equation cited above.

$$\psi_{est}(k)=\psi(k-1)+(v(k)-i(k)R)\cdot T, \text{ where } \psi(0)=0.$$

Additionally, the reference flux $\psi_{ref}$ is determined at this step according to the equation:

$$\psi_{ref}(k)=\alpha(\cdot)g(i(k)).$$

A logical node 226 compares each respective phase flux estimate $\psi_{est}$ with the phase switching reference flux $\psi_{ref}$ and generating a first logic level signal when the actual rotor angle is closer to axial alignment of the respective stator and rotor poles than the rotor angle reference, and generating a second logic level signal when the actual rotor angle is farther from axial alignment than the rotor angle reference. If not, a return is made to step 214 and steps 214 through 226 are repeated until the estimated flux $\psi_{ref}$ is greater than the reference flux $\psi_{ref}$. If the estimated flux $\psi_{ref}$ is greater than the reference flux $\psi_{ref}$, step 228 updates the estimated velocity $\omega_{ref}$. Steps 208 through 228 are repeated until the SRM is disabled.

Figure 7:
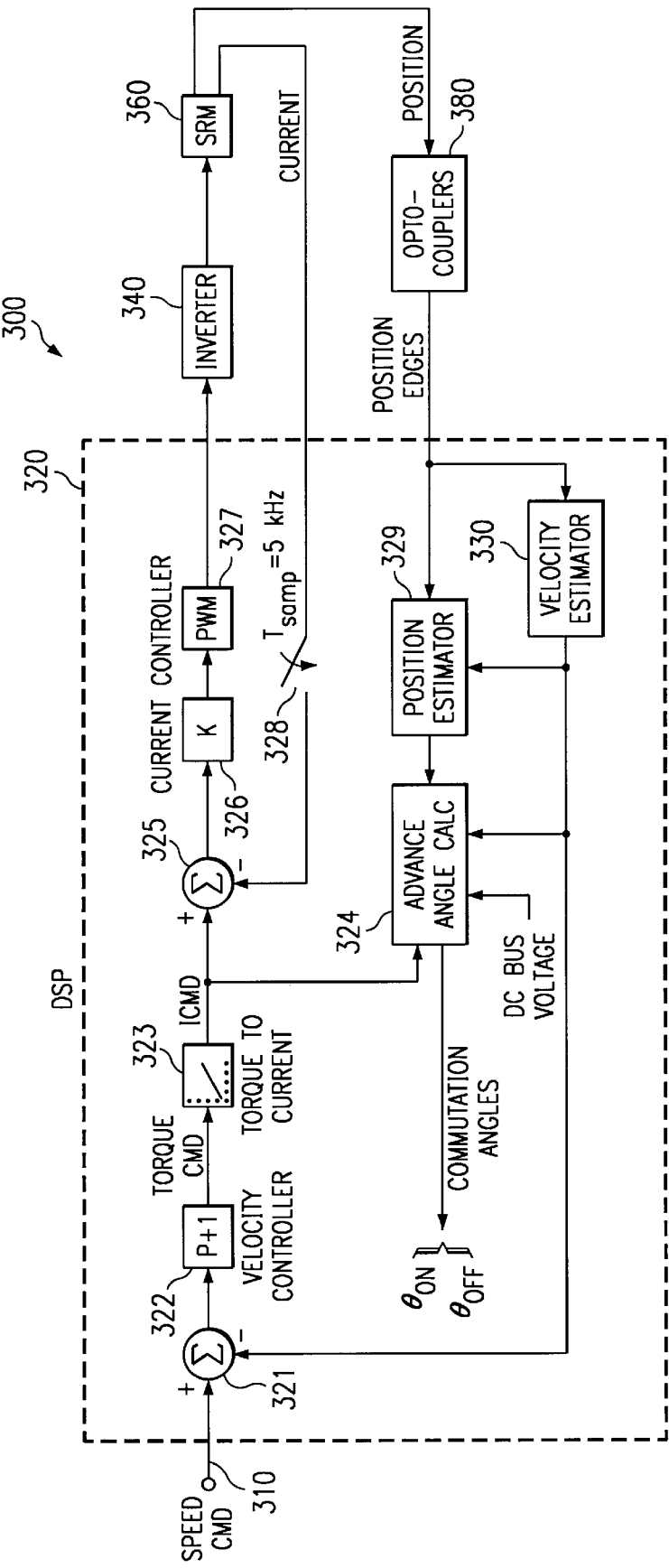
FIG. 7 is a block diagram of SRM controller, using position feedback.

As is exemplified for conventional systems in FIG. 7, a block diagram of an SRM controller using position feedback is illustrated. The circuit 300 essentially includes a digital signal processor (DSP) 320, an inverter 340, a SRM 360 and optocouplers 380. The DSP 320 includes a first summer 321, a velocity controller 322, a torque to current device 323, an advance angle calculator 324, a second summer 325, a current controller 326, a pulse-width modulator (PWM) 327, an analog-to-digital converter (ADC) 328, a position estimator 329, and velocity estimator 330. The DSP 320 is coupled to the inverter 340 which is connected to the SRM 360 having two output signals. The first output signal of the SRM 360 is coupled to the opto-couplers 380. The second is coupled to the DSP 320. The output of the opto-coupler is coupled to the DSP 320.

During operation, the DSP 320 receives a speed command 310. This signal is summed in first summer 321 with the signal generated by the velocity estimator 330. The summation is received by the velocity controller 322. The velocity controller 322 generates a torque command, which is received by the torque to current device 323. The current generated $i_{cmd}$ by the torque-to-current device 323 is send to the second summer 325 and to the advance angle calculator 324. At the second summer, the current signal received from the SRM 360 decrements the current $i_{cmd}$. The summation is received by the current controller 326. The signal generated by the current controller 326 is received by PVM 327 for generating a PWM command. The signal is received by the inverter 340 for inverting the signal to an analog signal readable by the SRM. The signal generated by the inverter 340 is received by the SRM 360. The SRM 360 generates a current signal and a rotor position signal. The current signal is coupled to the DPS 320 at the switch 328. The rotor position signal is coupled to the opto-couplers 380. It generates a signal that is fed into the DSP at the position estimator 329 and velocity estimator 330. The signal generated by the velocity estimator 330 is sent to the position estimator 329, the advance angle calculator 324 and the first summer 321. The position estimator 329 generates a signal fed to the advance angle calculator 324. The advance angle calculator 324 is coupled to a DC voltage Bus. The advance angle calculator 324 generates commutation angles for the rotor in the SRM 360.

Figure 8:
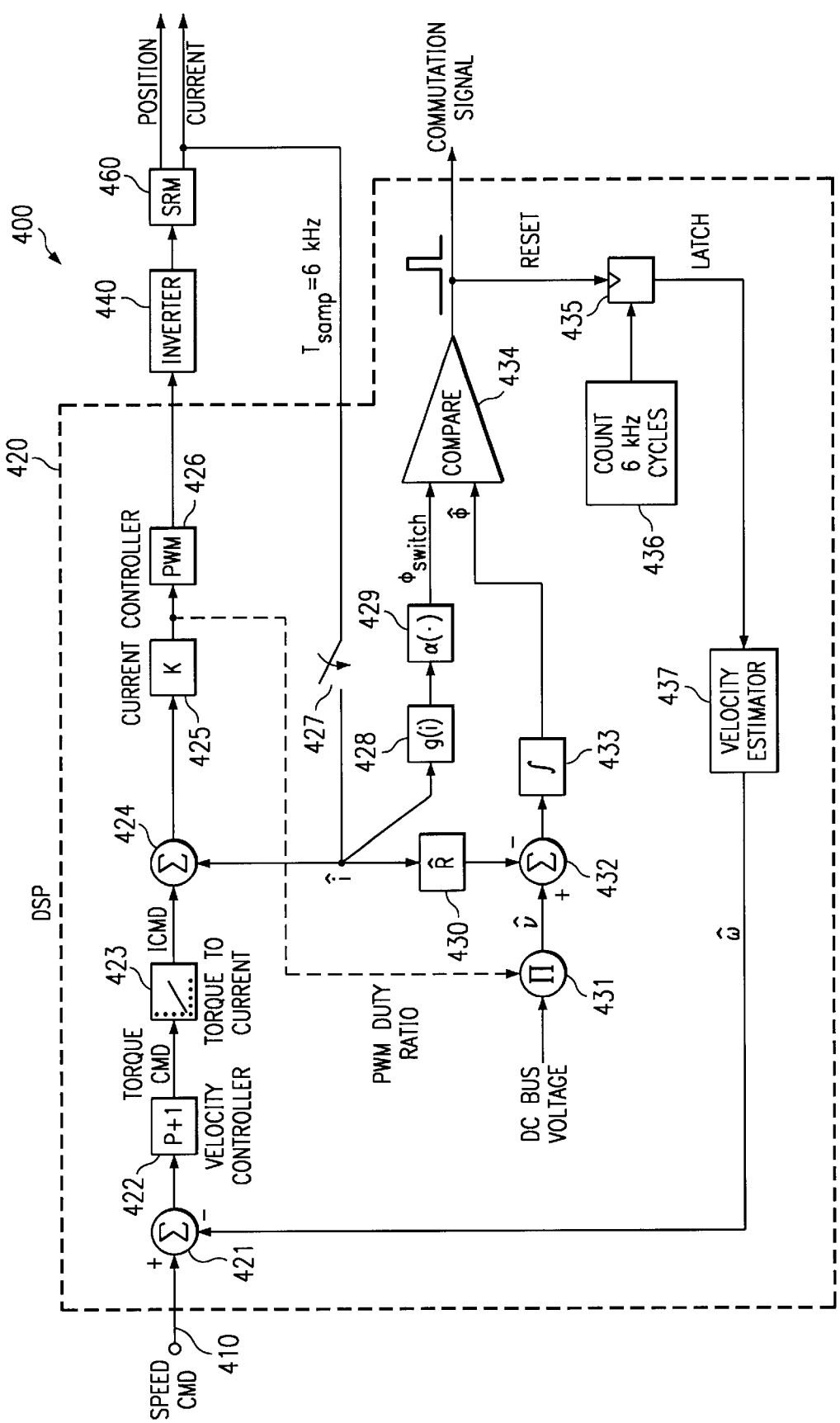
FIG. 8 is a block diagram of position sensorless SRM controller.

FIG. 8 illustrates the block diagram of a position sensorless SRM controller 400 in accordance with the principles of the present invention. The position sensorless SRM controller 400 essentially includes a DSP 420, an inverter 440 and a SRM 460. The DSP 420 is coupled to the inverter 440. The inverter 440 is coupled to the SRM 460. The DSP 420 includes a first summer 421, a velocity controller 422, a torque to current device 423, a second summer 424, a current controller 425, a pulse-width modulator (PWM) 426, an analog-to-digital converter (ADC) 427, a first storage device 428, a second storage device 429, a third storage device 430, a multiplier 431, a third summer 432, an integrator 433, a comparator 434, a clock signal generator 436 and a velocity estimator 437.

Accordingly in operation the DSP 420 receives a speed command signal 410. The DSP generates signals controlling the state of the power devices in the inverter 440. The SRM 460 reads the signal from the inverter 440 to control phase sequence commutation. The output current signal generated by the SRM 460 is measured by ADC 427. The first summer 431 receivers two inputs: the speed command signal 410 and the signal generated by the velocity estimator 437. The summed output is received by the velocity controller 422. The signal generated by the velocity controller 422 is fed into the torque-to-current device 423 which generates a current signal $i_{cmd}$. The second summer 424 sums input of the $i_{cmd}$, an output current signal generated by the SRM 460 and a signal stored in a third storage device 430. The summed output is received by the current controller 425 which generates a signal fed to the PWM 426. The output of the PWM 426 is fed to the inverter 440. Accordingly, the output current signal generated by the SRM 460 is measured by ADC 427. The first storage device filter 428 the signal with g(i). This signal is fed to a filter 429 of α(i) to generate reference flux $\psi_{ref}$. The reference flux signal $\psi_{ref}$ is fed to comparator 434. The estimated flux is calculated by summing the output of the current controller 425 and the DC bus voltage in the multiplier 431. The third summer 432 sums the product with the output of the third storage device 430 containing the estimated resistance of the SRM, R, in the third summer 432. The summed signal is fed to integrator 433 which ultimately generates the estimated flux $\psi_{est}$. The estimated flux $\psi_{ref}$ is fed to the comparator 434 which compares both the reference flux $\psi_{ref}$ and the estimated flux $\psi_{ref}$. The comparator 434 generates a commutation signal. The commutation signal is stored in a latch 435 which is driven by counter 436. The latched signal is fed to the velocity estimator 437.

Those skilled in the art to which the invention relates will appreciate that various substitutions, modifications and additions can be made to the described embodiments, without departing from the spirit and scope of the invention as defined by the claims.

What is claimed is:

1. A control system for a multiphase switch reluctance motor, having a rotor, for commutating the motor, comprising:
   a. a real-time calibration means for calibrating the rotor to a pre-determined position;
   b. a calculation means coupled to the real-time calibration means for calculating a plurality of current-flux characteristics of the motor from the calibrated rotor position to produce rotation of the rotor in a known direction;
   c. an estimator coupled to the calculation means for estimating the velocity and switching flux of the motor; and d. a sequencing means coupled to the estimator for commutating the rotor using the measured velocity and switching flux of the motor.

2. A control system as claimed in with claim 1 wherein the calculation means includes:
   a. a current sensing means for sensing phase current in at least one phase of said switched reluctance motor;
   b. a voltage sensing means coupled to the current sensing means for sensing phase voltage in at least one phase of said switched reluctance motor;
   c. a flux estimation means coupled to the voltage sensing means, and the current sensing means for estimating phase flux in at least one phase of the motor according to the expression:

$$\psi_j^a(i) = \int_0^\tau v_j - i_j r_j \, dt$$

where $\psi_j^a(i)$ is flux as function of time, $v_j$ is voltage, $i_j$ is current, j is an integer from 1 to n, $r_j$ is resistance, and $\tau$ is the upper bound of time;
   d. an interpolation means for curve fitting each respective phase current and estimated phase flux to a curve for each phase; and
   e. a storing means for receiving and storing polynomial coefficients of said line for each respective phase.

3. The control system in accordance with claim 2, wherein the voltage sensing means calculates the average voltage across each phase in a system using PWM current controller according to the expression:

$$v_j = d_j V_{bus}$$

where $v_j$ is the average voltage, $d_j$ is the duty ratio of the phase transistor switch and $V_{bus}$ is the inverter bus voltage.

4. A control system as claimed in claim 1 wherein the estimator includes:
   a. a speed calculation means for generating actual motor speed signals from said phase current and pase voltage signals; and
   b. a switching flux calculating means for calculating a switching flux according to the expression:

$$\psi_j(i) = \alpha \psi_j^a(i),$$

$\psi_j(i)$ is the switching flux as a function of time, the variable α, an advanced coefficient is a function of estimated speed ω, equals $\alpha_0 = k_\alpha |\omega(t)|$ and $\alpha_0$ and $k_\alpha$ are positive constants.

5. A control system as claimed in with claim 1 wherein the real-time calibration means comprises:
   a rotor position detection means for determining the initial position of the rotor to initiate a calibration sequence producing rotation in a known direction.

6. The control system in accordance with claim 5, wherein the rotor position detection means is a controller, for applying control signals to the phase windings to cause current to flow between the power source potentials through the phase windings and, in response to the sensed magnitude of the current flow through the phase windings, determining initial position of the rotor from a determination of relative magnitude of the current flow through the phase windings prior to activation of the phase windings to start rotation of the rotor.

7. A control system as claimed in with claim 1 wherein the sequencing means includes:
   a comparator means for comparing each respective phase flux estimate with said phase switching flux and generating a first logic level signal when the actual rotor angle is closer to axial alignment of the respective stator and rotor poles than said rotor angle reference, and generating a second logic level signal when the actual rotor angle is farther from axial alignment than said rotor angle reference, the output signal from said comparator means changing state when the actual rotor angle is equal to said rotor switching angle.

8. A method for commutating a multiphase switched reluctance motor, having a rotor, comprising the steps of:

a. calibrating the switched reluctance motor;

b. calculating the current-flux characteristics of the motor for producing rotation of the rotor in a known direction;

c. estimating the velocity and switching flux of the motor using the current-flux characteristics; and d. sequencing the rotor position as determined by the measured velocity and switching flux.

9. A method for commutating a multiphase A method for commutating a multiphase switched reluctance motor as claimed in claim 8 wherein the calculation step includes:

a. sensing phase current in at least one phase of said multiphase switched reluctance motor;

b. sensing phase voltage in at least one phase of said multiphase switched reluctance motor;

c. sensing phase flux in at least one phase of said multiphase switched reluctance motor;

d. storing said each respective phase current and estimated flux measurement; and e. interpolating a curve to fit each respective phase current and estimated flux measurement.

10. A method for commutating a multiphase switched reluctance motor as claimed in claim 8 wherein the sequencing step includes:

a. comparing each respective phase flux estimate with said phase switching flux and generating a first logic level signal when the actual rotor angle is closer to axial alignment of the respective stator and rotor poles than said rotor angle reference, and generating a second logic level signal when the actual rotor angle is farther from axial alignment than said rotor angle reference; and b. indicating when the actual rotor angle is equal to said rotor angle reference by a change in state between the first and second logic level signals.

11. A method for commutating a multiphase switched reluctance motor as claimed in claim 8 wherein the calibration step includes detecting the initial rotor position to initiate a calibration sequence producing rotation in a known direction.

* * * * *